Fig.1.

*Inventor*
Philip E. Burby
By his Attorney

Aug. 1, 1950 P. E. BURBY 2,516,954
FASTENING-INSERTING MACHINE
Filed Oct. 8, 1947 6 Sheets-Sheet 3

Inventor
Philip E. Burby
By his Attorney

Aug. 1, 1950     P. E. BURBY     2,516,954
FASTENING-INSERTING MACHINE
Filed Oct. 8, 1947     6 Sheets-Sheet 4

Inventor
Philip E. Burby
By his Attorney

Inventor
Philip E. Burby
By his Attorney

Aug. 1, 1950   P. E. BURBY   2,516,954
FASTENING-INSERTING MACHINE
Filed Oct. 8, 1947   6 Sheets-Sheet 6

*Inventor*
Philip E. Burby
By his Attorney

UNITED STATES PATENT OFFICE 2,516,954

FASTENING-INSERTING MACHINE

Philip E. Burby, Beverly, Mass., assignor to United Shoe Machinery Corporation, Flemington, N. J., a corporation of New Jersey Application October 8, 1947, Serial No. 778,661

28 Claims. (Cl. 1—20)

This invention relates to fastening-inserting machines, and is herein shown as applied to a machine which inserts staples in the margin of an upper and the lip of an insole in directions widthwise of the lip to fasten a toe binder wire in place at the opposite sides of the shoe bottom in the lasting of the toe end of a welt shoe. This machine, except as modified for purposes of the present invention, may be assumed to be constructed generally as disclosed in United States Letters Patent No. 2,420,684, granted on May 20, 1947, on an application of C. A. Robinson's. It is to be understood, however, that the invention is not limited to an organization of that particular character or to means for inserting fastenings in the form of staples.

The invention relates more particularly to the positioning of fastening-inserting mechanism in proper relation to a shoe prior to the insertion of the fastening. In the construction herein shown each of two mechanisms for inserting fastenings in a shoe in the manner above described is mounted on an automatically controlled support which is movable bodily with it heightwise of the shoe to a position determined by engagement with the insole. Also mounted on the support to move therewith is a cylinder-and-piston device for operating the mechanism by fluid pressure to insert the fastening. The construction shown is further such that the shoe is positioned bottom upward and the above-mentioned movement of the support is a downward movement effected by gravity at a predetermined time in the operation of the machine. Included in the fastening-inserting mechanism is an anvil member for clinching the fastening at the inner side of the lip of the insole, and to seat this member against the inner face of the lip there is provided means for swinging the support about an axis in proper time relation to its downward movement.

The above and other features of the invention, including various novel details of construction and combinations of parts, will now be more particularly described with reference to the accompanying drawings and thereafter pointed out in the claims.

Figure 1:
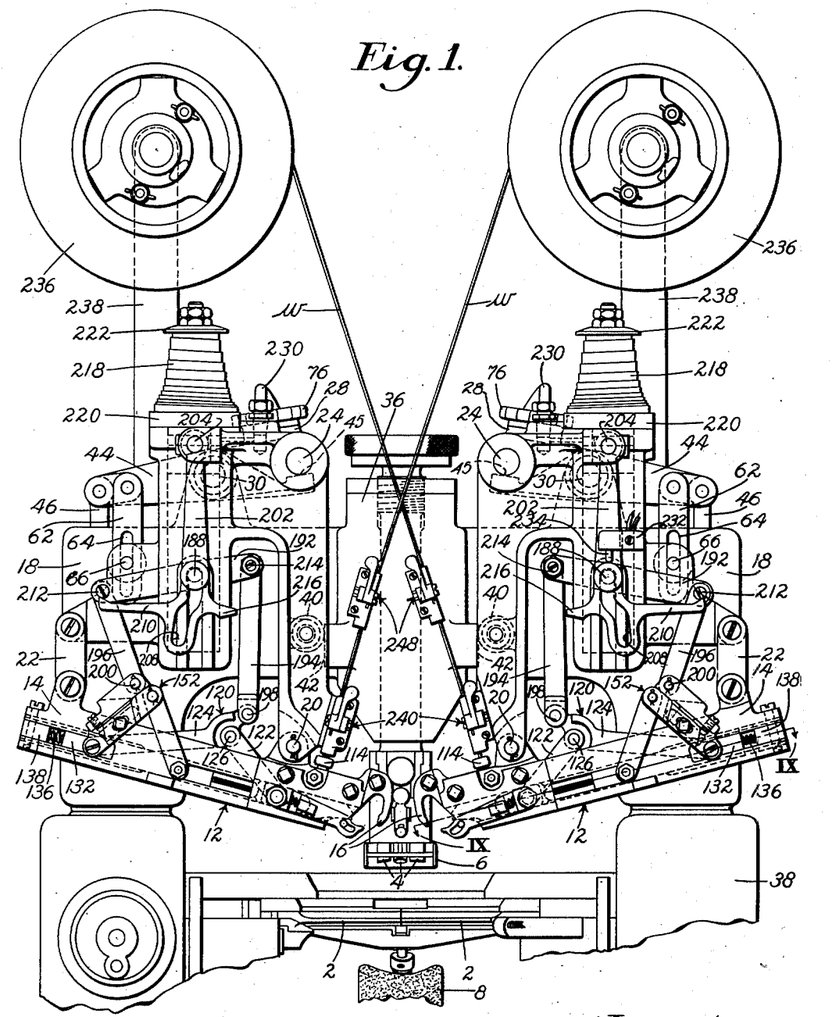
Fig. 1 is a view in front elevation of the upper portion of the machine to which the invention is herein shown as applied.
Figures 6, 7:
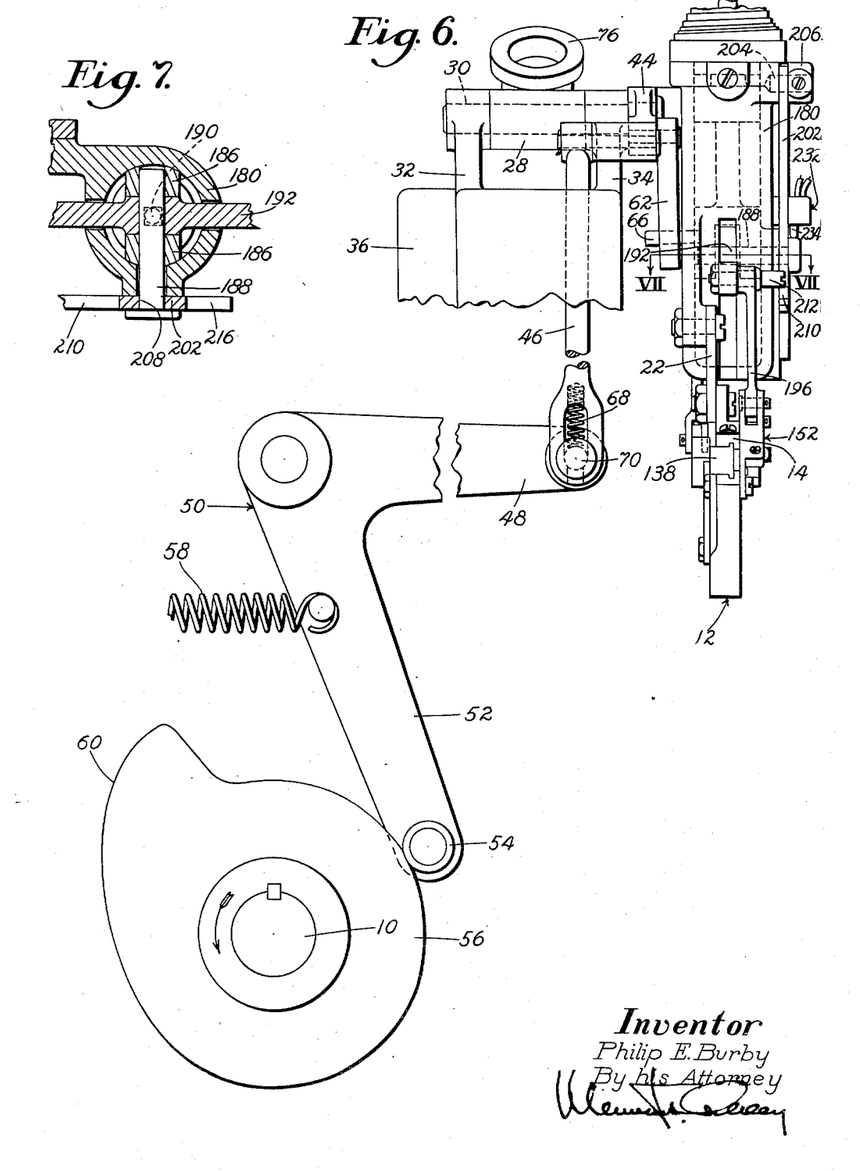
Fig. 6 is a view in left-hand side elevation, showing one of two controlling mechanisms associated respectively with the different fastening-inserting mechanisms for causing them to move downwardly and upwardly.
Fig. 7 is a section on the line VII—VII of Fig. 6.

As disclosed in detail in the above-mentioned Letters Patent, the machine shown is a power-operated toe-lasting machine having a pair of toe-embracing wipers 2 (Figs. 1 and 15) which wipe the margin of the toe end of a welt shoe upper into lasted position over the feather and against a welt-attaching lip $a$ on the insole $b$. To position the shoe in proper relation to the wipers there is provided a device which, as distinguished from the above-mentioned disclosure, is constructed substantially as shown and described in Letters Patent No. 2,385,414, granted on September 25, 1945, on an application of E. A. Holmgren's. It comprises three pins 4 arranged to engage the bottom face of the forepart of the insole to determine the position of the shoe height-wise and with respect to tipping movements and a member 6 which engages the inner face of the lip $a$ around the end and along the sides of the toe to position the shoe lengthwise and laterally. The shoe is clamped against the lower ends of the pins 4 by upward movement of a toe rest 8. The machine performs a cycle of operations corresponding to one complete rotation of a cam shaft 10 (Fig. 6), in the course of which cycle, by means not shown in detail, a binder wire $c$ (Fig. 15) is applied around the toe to secure the margin of the upper in lasted position against the lip of the insole. At a predetermined time, when the wipers 2 are holding the upper in lasted position and are also holding the wire pressed against the upper, the cycle of operations is automatically interrupted, and during the ensuing pause in the cycle a pair of fastening-inserting mechanisms 12 (Fig. 1), which may be termed stapling units, are operated by fluid-pressure means to form staples and to drive them at the opposite sides of the shoe bottom through the margin of the upper and the lip of the insole to fasten the binder wire to the shoe. Thereafter the machine resumes its cycle of operations to return various parts to starting positions.

Figures 3, 4, 5:
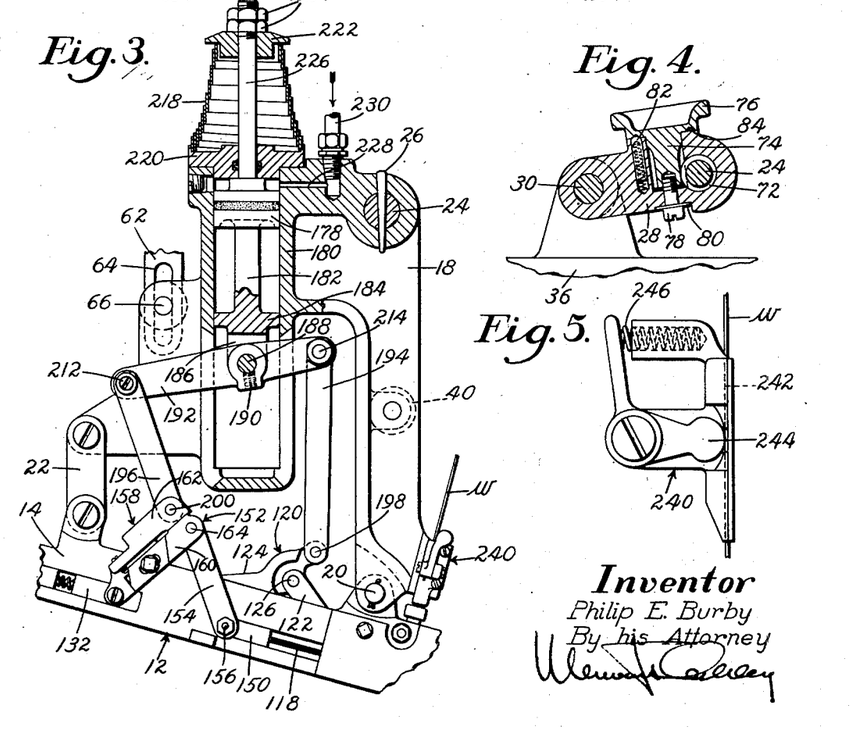
Fig. 3 is a view of the left-hand portion of the structure shown in Fig. 1, partly in front elevation and partly in section on the line III—III of Fig. 2.
Fig. 4 is a section on the line IV—IV of Fig. 2.
Fig. 5 is a view substantially in right-hand side elevation of a wire-controlling device shown in Fig. 3.
Figure 10:
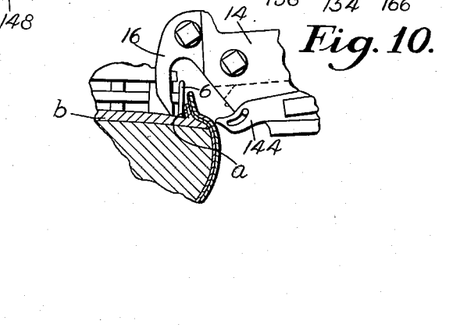
Fig. 10 is a view mainly in front elevation, showing a portion of the right-hand fastening-inserting mechanism and illustrating its relation to a shoe when it first engages the shoe upon its downward movement.

Each stapling unit 12 includes a bar 14 arranged to extend widthwise of the shoe in inclined relation to a horizontal plane and having fast on one end thereof an anvil member 16 arranged to engage the insole and to clinch the legs of the staple at the inner side of the lip $a$. For purposes of this invention each bar 14 is supported on a casting 18 by means of a pin 20 and a link 22, and each casting 18 is supported on a horizontal rod 24 to which it is secured by a pin 26 (Fig. 3). The rod 24 is mounted for turning movements in one end of an arm 28. This arm is mounted at its other end on a rod 30 for downward and upward swinging movements, the rod 30 being supported in ears 32 and 34 formed on a head casting 36 on the top of the frame 38 of the machine. It will thus be seen that the casting 18 may swing about the axis of the rod 24 to carry the stapling unit 12 in directions widthwise of the shoe and may move bodily in downward and upward directions as permitted by swinging movements of the arm 28 on the rod 30. Normally the weight of the casting and of the parts thereon maintains it, with respect to movement about the axis of the rod 24, in a position determined by engagement of a roll 40 mounted thereon with a vertical face 42 on the head casting 36. Pivotally mounted on each rod 30 is a lever 44 one end of which is arranged to underlie and normally to support the rod 24 and the casting 18 thereon, as shown at 45 in Fig. 1, the other end of this lever being connected by a link 46 to one arm 48 (Fig. 6) of a bell-crank lever 50 pivotally mounted on the frame of the machine. The other arm 52 of this bell-crank lever has thereon a roll 54 engaged by a cam 56 fast on the cam shaft 10. A spring 58 connected to the arm 52 holds the roll 54 at all times against the cam 56 and through the bell-crank lever 50, the link 46 and the lever 44 supports the rod 24 and the casting 18 normally at such a height that the anvil member 16 of the corresponding stapling unit 12 is positioned at some distance above the bottom of the shoe when the shoe is clamped against the positioning pins 4 by the toe rest 8. Prior to the previously mentioned pause in the cycle of operations a rise 60 on the cam 56 swings the bell-crank lever 50 in a counterclockwise direction with reference to Fig. 6 and thereby swings the lever 44 in the direction to permit downward movement of the casting 18. The casting is thus moved downwardly by gravity until the anvil member 16 engages the insole, the stapling unit 12 being thus positioned heightwise of the shoe as determined by the engagement of the anvil member with the insole. By reference to Fig. 10 it will be seen that when the anvil member first engages the insole it is positioned a short distance inwardly from the lip $a$ of the insole, thus insuring that it will be located farther inwardly than the lip in operating on shoes of different widths. Pivotally connected at its upper end to the lever 44 is a link 62 having therein a slot 64 into which extends a pin 66 fast in the casting 18. It will be understood that as the lever 44 is operated as above described to permit the casting 18 to move downwardly to the position determined by engagement of the anvil member 16 with the insole, the link 62 and the pin 66 move relatively to each other until the pin is substantially at the lower end of the slot 64, after which the lever 44 by its further movement acts through the link 62 to swing the casting 18 and the stapling unit 12 about the axis of the rod 24. In this manner the anvil member 16 is moved outwardly into engagement with the inner face of the lip of the insole, its outward movement being limited by the lip. Any further movement thereafter of the bell-crank lever 50 by the rise 60 on the cam 56 serves to compress a spring 68 (Fig. 6) which is mounted in a recess in the lower end of the link 46 and is engaged by a pin 70 carried by the arm 48 and movable upwardly in this recess. It will be understood that there are two such cams 56 and mechanisms associated therewith for controlling respectively the two stapling units.

Figure 2:
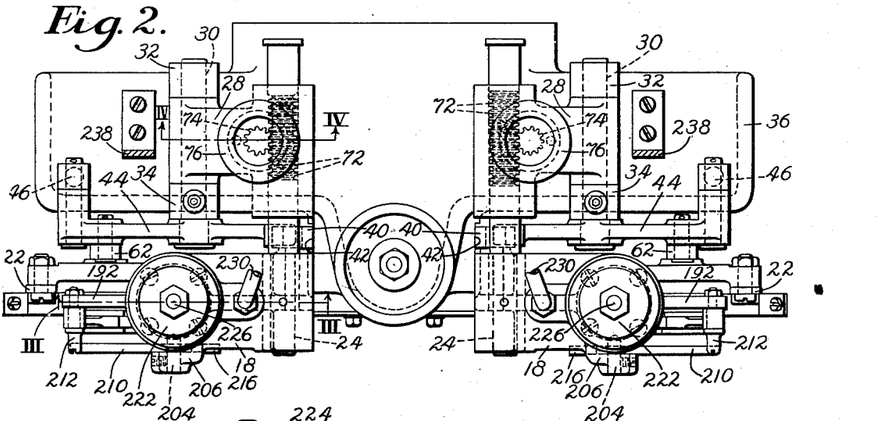
Fig. 2 is a plan view of the structure shown in Fig. 1, with parts broken away.

Formed on each of the rods 24 are a plurality of teeth 72 (Figs. 2 and 4) which extend around it and are engaged by a pinion 74 rotatable in a bearing in the arm 28, the pinion having integral therewith a hand wheel 76 which engages a bearing face on the arm. The pinion is held in place by a screw 78 which is threaded in the lower end thereof and extends through the arm, the head of the screw engaging a washer 80 which bears on the lower face of the arm. It will thus be seen that by turning either of the pinions 74 the casting 18 associated therewith may be independently adjusted with the stapling unit 12 thereon in directions lengthwise of the shoe as may be required by shoes of different sizes. To hold each stapling unit in adjusted position there is provided a spring-pressed pin 82 mounted in the arm 28 and having a rounded end arranged to enter any one of a series of corresponding recesses 84 in the hand wheel 76.

The two stapling units 12 are constructed in most respects as disclosed in the previously mentioned Letters Patent No. 2,420,684. Slidingly mounted in a guideway 86 (Fig. 8) in the inner end portion of the bar 14 of each unit is a staple-guiding throat 88 which includes a block 90 and another member 92 secured to the block and extending outwardly along the bar 14 beyond the block. Secured to the member 92 in spaced relation to the block 90 is a member 94 which serves as an outside former and by moving inwardly toward the shoe with the throat 88 forms a staple over an inside former 96 extending through a slot 98 (Fig. 9) in the member 92. An enlarged portion of the inside former is slidingly mounted in an opening in one side of the bar 14 and in a cap member 100 secured to the side of the bar and extends into a slot 102 formed in one side of the member 92. A spring 104 presses the inside former inwardly as far as permitted by the engagement of its enlarged portion with the member 92. Mounted in the space between the block 90 and the outside former 94 is a small block 106 which is located opposite the inside former when the parts are in their initial positions and is provided with a slot into which the staple-forming portion of the inside former extends. A pair of springs 108 positioned between the block 106 and the member 92 tend to move the block in a direction away from the inside former and hold it initially in a slot 110 (Fig. 9) formed in a small plate 112 which is secured to one side of the bar 14. With the block in this position a space is provided between it and the member 92 for the wire from which the staple is to be formed and for the bending of the legs of the staple about the inside former. In a manner hereinafter described the wire is caused to enter this space, between the outside former and one edge of the inside former, through a nipple 114 which is mounted in an opening in the bar 14. The length of wire required for the staple is severed from the rest of the wire, in response to the movement of the throat 88 and the outside former inwardly toward the shoe, by a cutter 116 which is fastened to the top of the outside former and has a cutting edge substantially contiguous to the lower end of the nipple 114 when the parts are in starting positions. In response to the movement of the throat and the outside former, as soon as the staple is formed, the inside former is forced outwardly by engagement of the member 92 therewith at one end of the slot 102 in this member to provide a clear path for a staple driver 118 which moves in guideways formed in the members 90 and 94. Also in response to the same movement the block 106 is forced inwardly against the resistance of the springs 108 by engagement of the plate 112 therewith at one end of the slot 110 in the plate to close the space between the block and the member 92, so that the block will assist in guiding the formed staple, the block being provided with a staple guideway arranged to aline with the guideways in the members 90 and 94.

Figures 11, 12, 13:
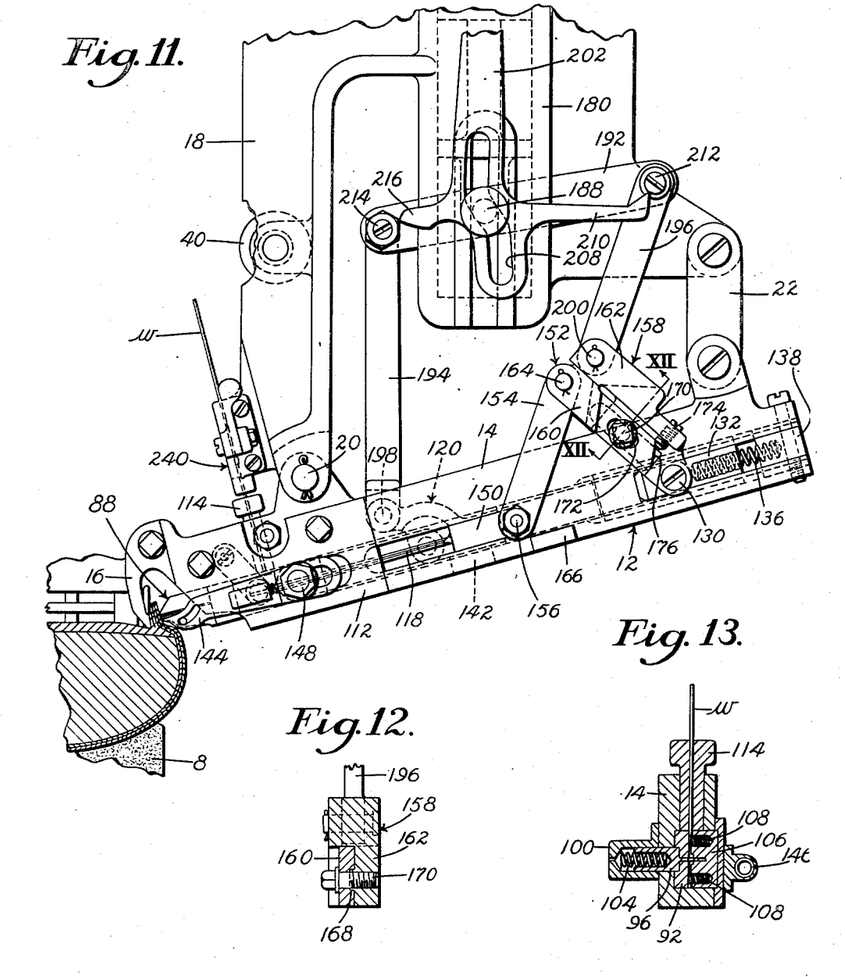
Fig. 11 is a view in front elevation of the right-hand fastening-inserting mechanism and parts associated therewith, with the parts as they appear after the forming of a staple but before it is driven.
Fig. 12 is a section on the line XII—XII of Fig. 11.
Fig. 13 is a section on the line XIII—XIII of Fig. 9.

Operative movement is imparted to the throat 88 and the outside former 94 of each stapling unit 12 through a toggle 120 (Fig. 1) comprising a pair of links 122 and 124 which are pivotally connected together by a pin 126. The link 122 is pivotally connected to a stud 128 (Figs. 8 and 9) on the member 92, and the link 124 is pivotally connected to a pin 130 mounted in a block 132 which is slidingly movable along a guideway 134 on the bar 14 and is controlled by a spring 136 mounted in a block 138 secured to the outer end of the bar. This spring normally holds the block 132 in a position determined by its engagement with a shoulder 140 on the bar 14. When the toggle 120 is straightened, by means hereinafter described, the throat 88 and the outside former 94 are moved inwardly toward the shoe, the throat being moved into engagement with the upper in the angle between the feather and the lip of the insole, as illustrated in Fig. 11. In this operation the wire is severed by the cutter 116, the outside former 94 forms a staple over the inside former 96, the inside former is retracted and the block 106 is moved inwardly into staple-guiding position in the manner hereinbefore explained. In response to resistance of the shoe to further inward movement of the throat 88 the block 132 is moved outwardly against the resistance of the spring 136 by further straightening of the toggle, the straightening of the toggle being positively limited by engagement of its link 124 with a stop 142 on one side of the bar 14. As the throat is thus moved inwardly, a finger 144 is operated yieldingly through a spring 146 (Fig. 9) by a stud 148 on the outside former 94 to position the binder wire c (Fig. 15) in proper relation heightwise of the shoe to the staple-guiding passage in the throat, in the same manner as disclosed in Letters Patent No. 2,420,684.

Each staple driver 118 is fastened to a driver bar 150 (Fig. 9) which is movable along a guideway in the bar 14. The driver bar is operated through another toggle 152 comprising a link 154 (Fig. 11) pivotally connected to a pin 156 in the driver bar and another link 158 which for a reason hereinafter explained is a compound link consisting of two members 160 and 162 adjustably secured together, the member 160 being pivotally connected by a pin 164 to the link 154 and the member 162 being pivotally connected to the previously mentioned block 132 by the same pin 130 which connects the link 124 of the toggle 120 to that block. The toggle 152 is straightened by means hereinafter described to operate the driver 118, its straightening movement being positively limited by engagement of the member 160 with a stop 166 on the bar 14.

Figure 15:
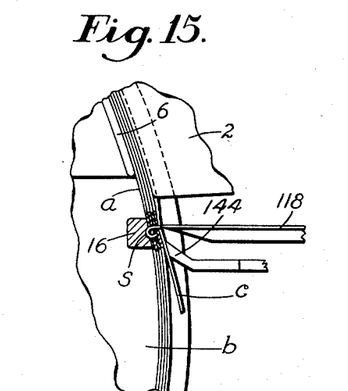
Fig. 15 is mainly a plan view, with parts removed and with other parts broken away, showing a staple as it appears in the shoe with the staple driver at the end of its driving movement.

As hereinabove explained, after the throat 88 has an pressed inwardly against the upper by its toggle 120, any further straightening of that toggle, to the limit determined by the stop 142, serves to move the block 132 outwardly against the resistance of the spring 136. Accordingly, since the compound link 158 of the driver-operating toggle 152 also is connected to the block 132, the driver-operating toggle is adjusted by this block as determined by the position of the throat 88 in engagement with the shoe. The limit of the operative movement of the driver 118 is therefore determined in accordance with the position of the throat 88, and the staple-engaging end of the driver is located in a definitely predetermined relation to the throat when the driver is at the end of its driving movement. Insurance is thus afforded that the driver will drive the staple precisely the desired distance into the shoe. The above-mentioned compound link 158 of the toggle 152 permits this distance to be adjustably varied. The two members 160 and 162 of this link are maintained in a parallel relation to each other by a tongue-and-groove connection 168 (Fig. 12) between them, and they are secured together by a screw 170 threaded in the member 162 and extending through a slot 172 (Fig. 11) in the member 160. This slot permits the effective length of the link 158 to be varied, with a resulting variation in the position of the end of the driver 118 relatively to the throat 88 at the end of the staple-driving movement. To facilitate a precise relative adjustment of the members 160 and 162 there is threaded in the member 162 a screw 174 having a tapered end arranged to engage an inclined end face 176 on the member 160. The legs of the staple s driven by the driver 118 are clinched by the anvil member 16 in such manner that they are turned reversely outward into the lip of the insole as shown in Fig. 15.

The two toggles 120 and 152 of each stapling unit 12 are operated by a single piston 178 (Fig. 3) movable in a cylinder 180 which is part of the casting 18. Extending downwardly from this piston is a rod 182 on which is formed an enlargement 184 of the same diameter as the piston for engaging the wall of the cylinder to assist in guiding the piston. Below the enlargement 184 are two downwardly extending ears 186 (Fig. 7) provided with bearings for a pin 188 to which is fastened by a setscrew 190 a lever 192 between the opposite ends of the lever. The two arms of this lever extend through vertical slots in the cylinder 180. One arm of the lever is connected by a link 194 to the toggle 120 and the other arm is connected by a link 196 to the toggle 152. The connection between the link 194 and the toggle 120 comprises a pin 198 mounted in an extension of the link 124 near the knee joint of the toggle, and the connection between the link 196 and the toggle 152 comprises a pin 200 mounted in the member 162 of the compound toggle link 158 near the knee joint of the toggle. It will thus be seen that the two toggles are operated through the lever 192 and the links 194 and 196 by downward movement of the piston 178. Since it is necessary that the staple be formed and the throat 88 be moved inwardly against the upper prior to the operation of the driver 118, mechanism is further provided for controlling the operations of the toggles in such manner that the toggle 120 is operated before the toggle 152. This mechanism comprises an arm 202 (Fig. 1) pivotally suspended at its upper end on a pin 204 mounted in an ear 206 (Fig. 2) formed on the upper end of the cylinder 180, the arm having formed therein near its lower end a cam slot 208 into which extends the front end of the pin 188 (Fig. 7) through a vertical slot in the wall of the cylinder 180. Formed on the arm 202 is a laterally extending finger 210 the end of which lies initially under the forwardly projecting end of a stud 212 which serves as the pivotal connection between the link 196 and one end of the lever 192 (see Figs. 1 and 6). The finger 210 therefore initially locks that end of the lever 192 against downward movement when the piston is moved downwardly, thus preventing the straightening of the toggle 152 while the lever swings about the stud 212 as a fulcrum to operate the toggle 120. By the time this toggle arrives at the limit of its operative movement determined by the stop 142, the pin 188, by its action on an inclined intermediate portion of the cam slot 208, has swung the arm 202 so far laterally as to permit the stud 212 to start downwardly (see Fig. 11). Continued downward movement of the piston 178 serves to swing the arm 202 still farther laterally in the direction to carry the finger 210 away from the stud 212 while at the same time the toggle 152 is operated to drive the staple, the lever 192 swinging at this time about a stud 214 which serves as the pivotal connection between it and the link 194 (see Fig. 14). As the arm 202 is thus swung farther laterally, another finger 216 on the arm is moved to a position over the stud 214. Upon reverse upward movement of the piston 178, therefore, the finger 216 initially locks the toggle 120 against return movement, so that the toggle 152 is first returned to retract the driver. Substantially at the end of the return movement of this toggle the reverse movement of the arm 202 by the pin 188 carries the finger 210 again under the stud 212 and removes the finger 216 from over the stud 214. By further upward movement of the piston, therefore, the toggle 120 is returned to its initial position. The upward movement of the piston is effected by a spring 218 which is seated on a head 220 of the cylinder 180 and engages a member 222 confined by nuts 224 on a rod 226 extending upwardly from the piston through the head 220.

Operating fluid, preferably oil, is delivered into the upper ends of the two cylinders 180 through passages 228 and conduits 230 portions of which are flexible to permit the movements of the castings 18. Admission of the fluid under pressure to the cylinders and later release of the fluid therefrom to permit return of the pistons 178 are effected by a valve (not shown) which may be assumed to be of substantially the same construction and controlled in the same manner as the valve 540 shown in Letters Patent No. 2,420,684. That is, the valve is operated automatically to admit the fluid just prior to the pause in the cycle of operations of the machine and after the driving of the staples is returned to exhaust position to permit the return of the pistons.

By means not herein shown, but fully disclosed in the above-mentioned Letters Patent No. 2,240,684, the cycle of operations of the machine is initiated by electrical actuation of a clutch through which the cam shaft 10 (Fig. 6) is operated, the clutch being later so controlled as to interrupt the cycle for the purpose hereinbefore explained. After the driving of the staples the clutch is again electrically actuated, this time automatically, to cause the machine to complete its cycle. In the machine shown in said Letters Patent this second actuation of the clutch results from the closing of two electrical switches in response to movements of the stapling units away from the shoe. In the construction herein shown the same result is accomplished by the closing of a single switch 232 (Figs. 1 and 6) controlled by one of the pistons 178. This switch includes a member 234 which is moved upwardly to close the circuit by engagement of the outer end of the pin 188 therewith when the piston arrives substantially at the end of its return movement. The switch 232 thus performs the function of the two switches 668 shown in the above-mentioned Letters Patent.

Figures 8, 9:
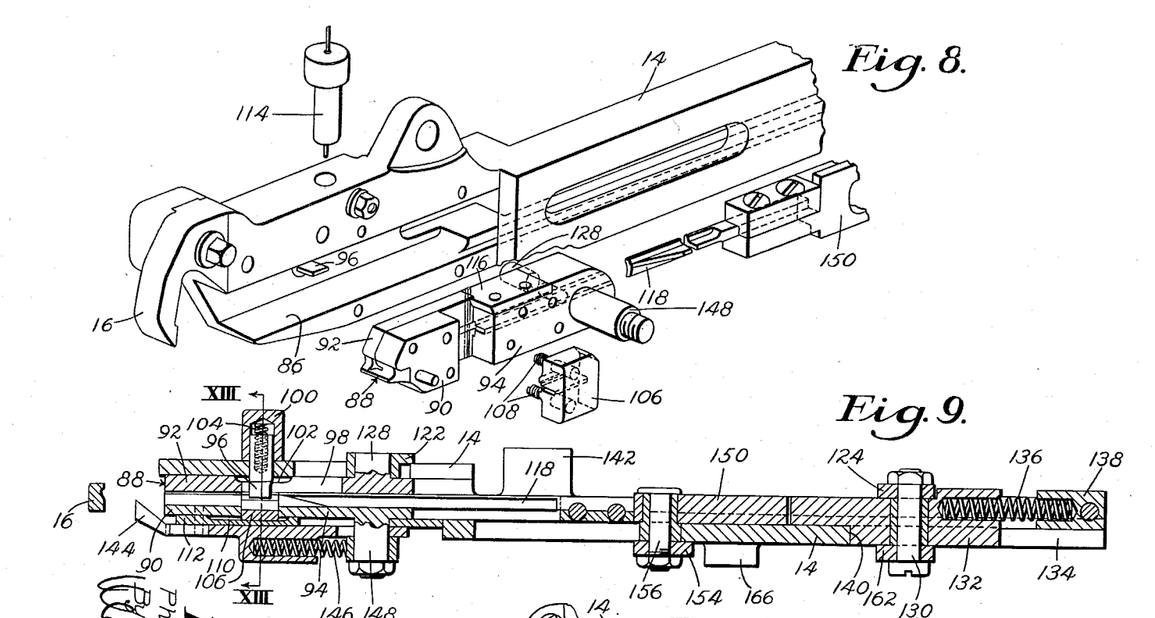
Fig. 8 is an exploded view of the right-hand fastening-inserting mechanism.
Fig. 9 is a sectional view of the same mechanism on the line IX—IX of Fig. 1.

The wire w for forming the staples is supplied from two reels 236 supported on brackets 238 extending upwardly from the head casting 36. The two strands of wire are crossed so as to aline more nearly with the passages in the nipples 114. Each strand extends through a gripper device 240 mounted on the casting 18 which supports the corresponding stapling unit 12. As shown in Fig. 5, this device is provided with a guideway 242 for the wire and with a pivotally mounted bell-crank lever 244 one arm of which is held in frictional engagement with the wire by a spring 246 acting on the other arm. The device is so arranged that when the stapling unit is moved downwardly by the casting 18 it pulls the wire along with it and when it is moved upwardly the device slips along the wire, upward movement of the wire being prevented by another similar gripping device 248 mounted on the head casting 36. Accordingly, the wire is fed by the downward movement of the stapling unit and is received within the unit ready for the forming of the next staple when the unit is moved upwardly. The extent of the movement of the unit corresponds substantially to the length of the portion of the wire required for the staple, but is preferably sufficient to insure that upon upward movement of the unit the end of the wire will be engaged by the lower wall of the guideway 86 (Fig. 8).

The manner of operation of the machine, in so far as it is of interest with reference to the present invention, will now be briefly summarized. Substantially at the beginning of the cycle of operations the shoe is clamped by the toe rest 8 against the pins 4 in the position further determined by engagement of the member 6 with the inner face of the lip of the insole. In the course of the cycle the wipers 2 are operated to wipe the toe end of the upper into lasted position with its marginal portion over the feather and against the lip $a$ of the insole and a binder wire $c$ (Fig. 15) is applied around the toe in the angle between the feather and the lip in position to hold the upper, as fully disclosed in Letters Patent No. 2,420,684. At a predetermined time in the cycle the cams 56 arrive in positions to cause the two castings 18 and the stapling units 12 supported thereon to be moved downwardly by gravity to the positions determined by engagement of the anvil members 16 with the insole, the cams further acting to swing the castings outwardly about the axes of the rods 24 and thus to press the anvil members yieldingly through the springs 68 against the inner face of the lip of the insole. When the stapling units are thus moved downwardly the gripper devices 240 on the castings 18 pull the staple-forming wire $w$ also downwardly, the units already having within them the portions of the wire from which the next staples are to be formed.

Figure 14:
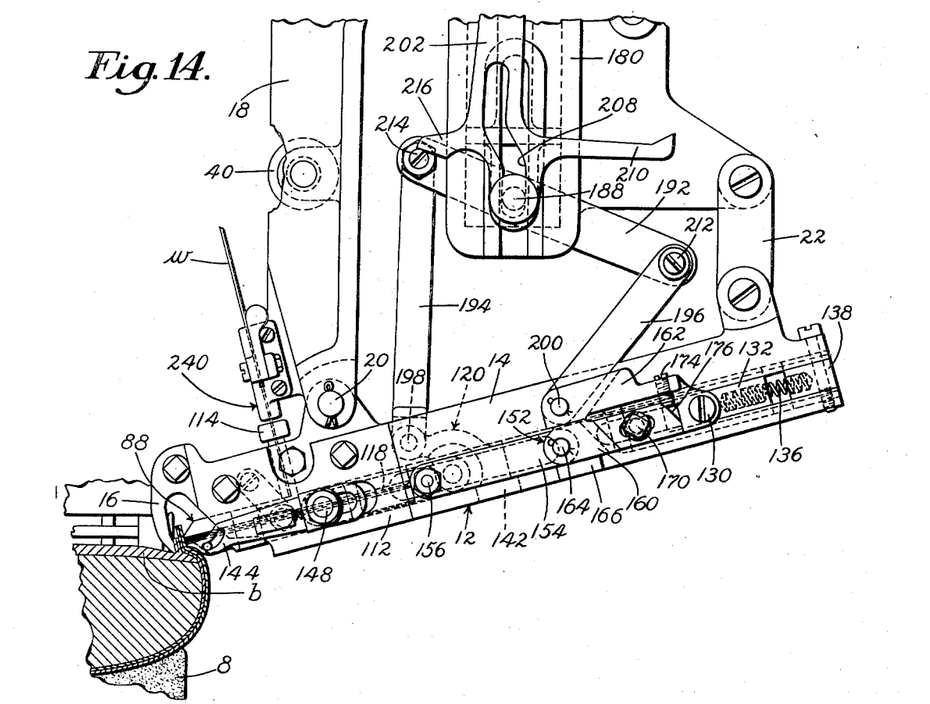
Fig. 14 is a view similar to Fig. 11 with the parts as they appear at the end of the staple-driving operation.

After the downward movements of the stapling units and the outward movements of the anvil members against the lip of the insole, while the wipers 2 are holding the upper in lasted position and are pressing the binder wire against the margin of the upper, the cycle of operations is automatically interrupted by stopping the rotation of the cam shaft 10. Immediately prior to this pause in the cycle operating fluid is admitted to the cylinders 180 to cause downward movements to be imparted to the pistons 178 while the machine is otherwise at rest. The first effect of the downward movements of the pistons is to operate the toggles 120 through swinging movements of the levers 192 about the studs 212 as fulcrums, since these studs are locked against downward movements by the fingers 210. In this manner the wire is cut, the staples are formed and the throats 88 are moved into positions to clamp the margin of the upper and the lip of the insole against the anvil members 16. Near the end of the operative movements of the toggles 120 the pins 188 begin to swing the arms 202 in the directions to withdraw the fingers 210 from under the studs 212, and by the time these toggles are fully straightened the fingers have been moved far enough to permit the studs 212 to start downwardly (Fig. 11). Accordingly, by continued movements of the pistons 178 the toggles 152 are operated to drive the staples by swinging movements of the levers 192 about the studs 214 as fulcrums, the arms 202 being swung still farther to carry the fingers 210 away from the studs 212 and also to carry the other fingers 216 thereon over the studs 214 (Fig. 14).

Immediately after the driving of the staples the valve which controls the admission of fluid to the cylinders 180 is moved to exhaust position in the manner disclosed in Letters Patent No. 2,420,684, to cause the pistons 178 to be returned by the springs 218. By such return of the pistons the toggles 152 are first returned, since the toggles 120 are locked by the fingers 216, after which these toggles are unlocked and returned and the fingers 210 are moved to their initial positions under the studs 212. Substantially at the end of the return movement of one of the pistons the switch 232 is closed to cause the machine to resume its cycle of operations. Shortly thereafter the cams 56 arrive in positions to cause the bell-crank levers 50 to be swung by the springs 58 in the directions to move the castings 18 and the stapling units 12 upwardly and to permit return movements of the units about the axes of the rods 24. As the units are thus moved upwardly they receive the wire for the next staples, since the gripper devices 240 which move with the units slip along the wire and upward movement of the wire is prevented by the gripper devices 248. It will further be understood that in this final stage of the cycle other parts of the machine also are returned to their starting positions and the shoe is released.

Novel features of the means herein disclosed for operating a throat member or a staple-forming member and a driver by a single reciprocatory member or piston are claimed in a divisional application, Serial No. 51,689, filed on September 29, 1948.

Having described the invention, what I claim as new and desire to secure by Letters Patent of the United States is:

1. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, a support for said mechanism mounted to move bodily with it heightwise of the shoe to a position determined by engagement of said mechanism with the insole prior to the fastening-inserting operation, and automatic means for causing such movement of said support at a predetermined time in the operation of the machine.

2. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including an anvil member for clinching the fastening at the inner side of the lip, a support for said mechanism mounted to move bodily with it heightwise of the shoe to a position determined by engagement of said anvil member with the insole prior to the fastening-inserting operation, and cam-controlled means for causing such movement of said support at a predetermined time in the operation of the machine.

3. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a driver and a toggle for operating the driver, and a support for said mechanism movable to carry said driver and toggle bodily in the same direction heightwise of the shoe to position them relatively to the shoe prior to the fastening-inserting operation.

4. In a fastening-inserting machine, the combination with means for positioning a shoe having an insole provided with a lip arranged to be engaged by the margin of the upper, of mechanism for forming a staple and for driving it into the margin of the upper and the lip of the insole in a direction widthwise of the lip, and a support for said mechanism movable bodily with it heightwise of the shoe to position it relatively to the shoe prior to the forming and driving of the staple.

5. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a throat member for guiding the fastening, operating means for moving said throat member toward the shoe in the direction in which the fastening is inserted, and other means for causing said mechanism to move heightwise of the shoe to position it relatively to the shoe prior to the operative movement of said operating means for the throat member.

6. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a throat member for guiding the fastening, a cylinder and a piston relatively movable by fluid pressure to move the throat member toward the shoe in the direction in which the fastening is inserted, and means for causing said mechanism to move heightwise of the shoe to position it relatively to the shoe prior to relative movement of said cylinder and piston.

7. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, and a cylinder-and-piston device for thus operating said mechanism by fluid pressure, said mechanism and the cylinder-and-piston device being mounted to move as a unit heightwise of the shoe to position them relatively to the shoe prior to the fastening-inserting operation.

8. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, a cylinder-and-piston device for thus operating said mechanism by fluid pressure, said mechanism and the cylinder-and-piston device being mounted to move as a unit heightwise of the shoe to a position determined by engagement with the insole, and automatic means for causing them thus to move at a predetermined time in the operation of the machine prior to the fastening-inserting operation.

9. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, means on which said mechanism is mounted for downward movement by gravity to position it relatively to the shoe, and automatic means for causing the mechanism thus to move downwardly prior to the fastening-inserting operation.

10. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, said mechanism being arranged to be moved downwardly by gravity to position it relatively to the shoe, and cam-controlled means for holding the mechanism initially upraised and for releasing it to permit it thus to be moved downwardly prior to the fastening-inserting operation.

11. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, means on which said mechanism is mounted for downward movement by gravity to position it relatively to the shoe, spring means for holding the mechanism initially upraised, and a cam arranged to act on said spring means to release the mechanism and thus to permit it to be moved downwardly prior to the fastening-inserting operation.

12. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, means on which said mechanism is mounted for downward movement by gravity to position it relatively to the shoe, a lever for supporting said mechanism, a spring arranged to act on said lever to hold the mechanism initially upraised, and means for swinging the lever against the resistance of the spring to release the mechanism and thus to permit it to be moved downwardly prior to the fastening-inserting operation.

13. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, said mechanism being arranged to be moved downwardly by gravity to position it relatively to the shoe and having means for engaging the bottom of the shoe to limit its downward movement, and means for holding the mechanism initially upraised and for automatically releasing it at a predetermined time in the operation of the machine to permit it thus to be moved downwardly prior to the fastening-inserting operation.

14. In a fastening-inserting machine, the combination with means for positioning a shoe bottom upward, of mechanism for inserting a fastening in the shoe, said mechanism comprising a guide for the fastening and a driver arranged to be moved downwardly as a unit by gravity to position them relatively to the shoe, and automatic means for causing said guide and driver thus to be moved downwardly at a predetermined time in the operation of the machine prior to the operation of the driver.

15. In a fastening-inserting machine, the combination with means for positioning a shoe bottom upward, of mechanism for inserting a fastening in the shoe, said mechanism comprising a guide for the fastening and a driver arranged to be moved downwardly as a unit by gravity to positions determined by the shoe, and means including a cam-controlled lever for initially holding said guide and driver upraised and for releasing them to permit them thus to be moved downwardly at a predetermined time in the operation of the machine prior to the operation of the driver.

16. In a fastening-inserting machine, the combination with means for positioning a shoe bottom upward, of mechanism for inserting a fastening in the shoe, a cylinder-and-piston device for thus operating said mechanism by fluid pressure, said mechanism and the cylinder-and-piston device being arranged to be moved downwardly as a unit by gravity to position them relatively to the shoe, and automatic means for causing them thus to be moved downwardly at a predetermined time in the operation of the machine prior to the fastening-inserting operation.

17. In a fastening-inserting machine, the combination with means for positioning a shoe bottom upward, of mechanism for inserting a fastening in the shoe, a cylinder-and-piston device for thus operating said mechanism by fluid pressure, a support common to said mechanism and to said cylinder-and-piston device and mounted to move with them in downward and upward directions, and means for holding said support initially upraised and for lowering it automatically at a predetermined time in the operation of the machine to position said mechanism relatively to the shoe prior to the fastening-inserting operation.

18. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a member for engaging the inner face of the lip to clinch the fastening, a cylinder-and-piston device for operating said mechanism by fluid pressure to insert the fastening, a support common to said mechanism and to said cylinder-and-piston device and movable with them in directions heightwise of the shoe, and means for causing said support thus to move heightwise of the shoe to carry said mechanism toward the shoe and also to move in a different direction to seat said clinching member against the inner face of the lip of the insole.

19. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a member for engaging the inner face of the lip to clinch the fastening, a cylinder-and-piston device for operating said mechanism by fluid pressure to insert the fastening, a support common to said mechanism and to said cylinder-and-piston device and movable bodily with them in directions heightwise of the shoe, and means for causing said support thus to move heightwise of the shoe to carry said mechanism toward the shoe and for also swinging it about an axis to seat said clinching member against the inner face of the lip of the insole.

20. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a throat member formed to guide the fastening and movable inwardly into engagement with the margin of the upper and also a member for engaging the inner face of the lip to clinch the fastening, and means for causing said mechanism to move heightwise of the shoe to position it relatively to the shoe and also to move in a different direction to seat said clinching member against the inner face of the lip prior to the inward movement of the throat member.

21. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a throat member formed to guide the fastening, a toggle for moving the throat member inwardly into engagement with the margin of the upper and a member for engaging the inner face of the lip to clinch the fastening, and means for causing said mechanism to move heightwise of the shoe to a position determined by engagement of said clinching member with the insole and also to move in a different direction to seat said clinching member against the inner face of the lip prior to the operation of said toggle.

22. In a fastening-inserting machine, the combination with means for positioning a shoe having an insole provided with a lip arranged to be engaged by the margin of the upper, of mechanism for inserting a fastening in the margin of the upper and the lip of the insole in a direction widthwise of the lip, said mechanism including a member for engaging the inner face of the lip to clinch the fastening, a support for said mechanism movable with it relatively to the shoe, and means for causing said support to move bodily heightwise of the shoe to position the mechanism relatively to the shoe and also to swing in a different direction about an axis to seat said clinching member against the inner face of the lip.

23. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, said mechanism including a member for engaging the inner face of the lip to clinch the fastening, a support for said mechanism movable with it relatively to the shoe, means for holding said support initially upraised and for causing it to be moved downwardly by gravity to position the mechanism relatively to the shoe, and additional means for moving said support in a different direction to seat said clinching member against the inner face of the lip.

24. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, said mechanism including a member for engaging the inner face of the lip to clinch the fastening, a support for said mechanism movable with it relatively to the shoe, means for causing said support to be moved downwardly by gravity to position the mechanism relatively to the shoe, and additional means for swinging said support about an axis to seat said clinching member against the inner face of the lip.

25. In a fastening-inserting machine, the combination with means for positioning bottom upward a shoe having an insole provided with a lip arranged to be engaged by the margin of the upper, of mechanism for inserting a fastening in the margin of the upper and the lip of the insole in a direction widthwise of the lip, said mechanism including a member for engaging the inner face of the lip to clinch the fastening, a support for said mechanism movable with it relatively to the shoe, a lever arranged to hold said support initially upraised and movable to release it and thus to permit it to be moved downwardly by gravity to position the mechanism relatively to the shoe, and means arranged to be operated also by said lever to swing said support about an axis in the direction to seat said clinching member against the inner face of the lip.

26. In a fastening-inserting machine, the combination with means for positioning a shoe having an insole provided with a lip arranged to be engaged by the margin of the upper, of mechanisms for inserting fastenings in the margin of the upper and the lip of the insole in directions widthwise of the lip at the opposite sides of the shoe respectively, said mechanisms being adjustable each independently of the other in directions lengthwise of the shoe to vary the positions of the fastenings.

27. In a fastening-inserting machine, the combination with means for positioning a shoe having an insole provided with a lip arranged to be engaged by the margin of the upper, of mechanisms for inserting fastenings in the margin of the upper and the lip of the insole in directions widthwise of the lip at the opposite sides of the shoe respectively, and controlling devices associated respectively with said different mechanisms for causing them to move heightwise of the shoe to position them relatively to the shoe prior to the insertion of the fastenings, the mechanisms being adjustable lengthwise of the shoe relatively to said controlling devices.

28. In a fastening-inserting machine, the combination with means for positioning bottom upward a shoe having an insole provided with a lip arranged to be engaged by the margin of the upper, of mechanisms for inserting fastenings in the margin of the upper and the lip of the insole in directions widthwise of the lip at the opposite sides of the shoe respectively, said mechanisms being mounted for downward and upward movements, and controlling devices associated respectively with the different mechanisms for holding them initially upraised and for causing them to be moved downwardly by gravity to position them relatively to the shoe prior to the insertion of the fastenings, the mechanisms being adjustable lengthwise of the shoe relatively to said controlling devices.

PHILIP E. BURBY.

REFERENCES CITED

The following references are of record in the file of this patent:

UNITED STATES PATENTS

| Number | Name | Date |
| --- | --- | --- |
| 873,888 | Olsson | Dec. 17, 1907 |
| 1,854,310 | Lawson | Apr. 19, 1932 |
| 2,418,140 | Robinson | Apr. 1, 1947 |
| 2,420,685 | Robinson | May 20, 1947 |